Harrison & Condie.

Folding-Chair.

No. 2891 Reissued Mar. 10, 1868.

Witnesses

William Sturme

James N. Mills

Inventor

Benj. J. Stanson

James Condie

UNITED STATES PATENT OFFICE.

BENJAMIN J. HARRISON AND JAMES CONDIE, OF NEW YORK, N. Y.

IMPROVED FOLDING CHAIR.

Specification forming part of Letters Patent No. 56,410, dated July 17, 1866; Reissue No. 2,891, dated March 10, 1868.

*To all whom it may concern:*

Be it known that we, BENJAMIN J. HARRISON and JAMES CONDIE, both of the city, county, and State of New York, have invented certain new and useful Improvements in Folding Chairs; and we do hereby declare that the following is a full, clear, and exact description of the same, reference being had to the accompanying drawings, making a portion of this specification, in which—

Figure 1:
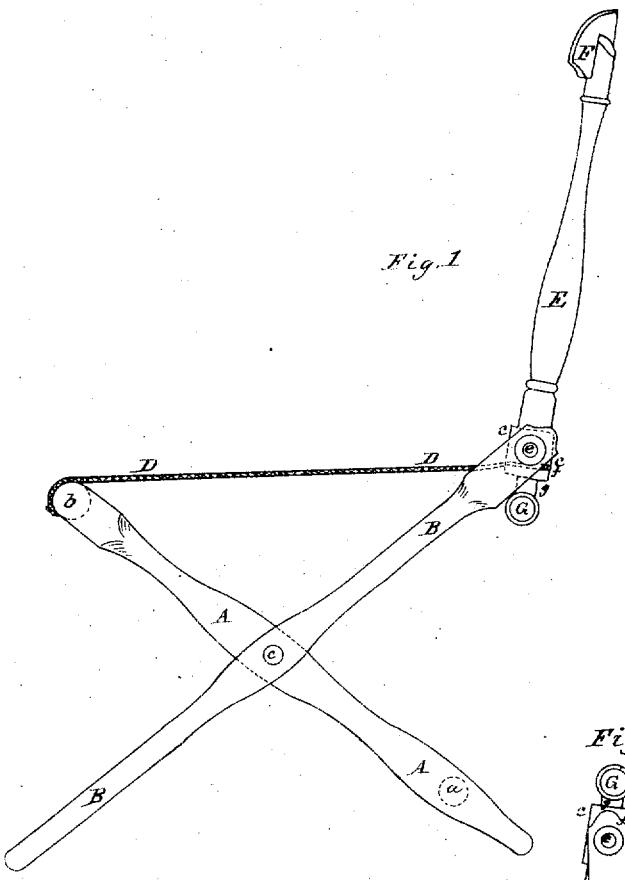
Figure 3:
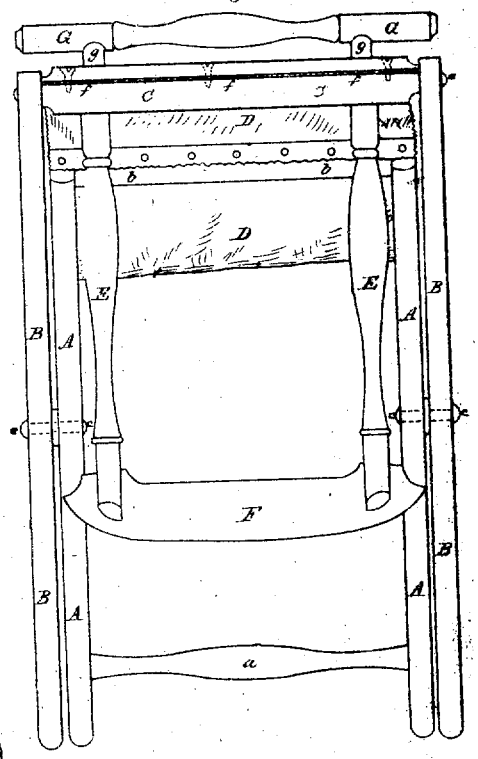
Figure 2:
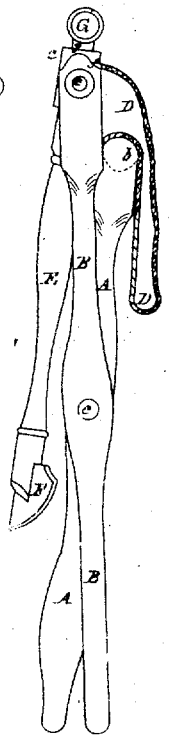

Figure 1 is a side view of the chair in an extended position. Fig. 2 is a side view of the same in a folded or closed position. Fig. 3 is a front view of the same in a folded position.

Similar letters of reference indicate corresponding parts in all the figures.

This invention consists in a novel construction of a folding chair, whereby the chair is rendered much more firm and steady when in an open or extended position, and capable of being carried about when in such open or extended position with much greater ease and convenience than the folding chairs heretofore in use, and, furthermore, whereby it may be folded up for transportation in large numbers, and also be carried singly in the hand when folded or closed with much greater facility than such ordinary folding chairs, and, furthermore, whereby it is rendered very simple, and capable of being manufactured at a very moderate cost.

To enable others to understand the nature and construction of our invention, we will proceed to describe it with reference to the drawings.

A represents two legs, which are connected together near their lower extremities by means of a transverse round or bar, *a*, and at their upper ends by another transverse bar, *b*, which constitutes the front seat-rail of the chair.

B represents two other legs, which are somewhat longer than the legs A, and are placed upon the outer sides of the said legs A, and are pivoted thereto at the central parts thereof by means of transverse bolts or pivots *c*.

C is a transverse bar, the ends of which are pivoted in the upper ends of the back seat-rail of the chair.

D is the flexible seat or bottom of the chair, which is made of cloth, carpet, or other suitable pliable material, and has its front edge secured by any appropriate means to the front seat-rail, *b*, while its rearmost edge is attached to the back seat-rail, C, below the axis or the pivots *e* of the said back seat-rail, as shown at *f*. The back of the chair is formed of two posts or arms, E, the lower ends of which are firmly secured in the back seat rail, C, one of the said posts being situated at each end of the said rail C, and at right angles thereto, as shown more clearly in Fig. 3. These posts E are connected at the top by a suitable cross-piece, E. The lowermost portions of the post E project through and below the back seat-rail, C, as shown at *g*, and have fitted upon their extremities a transverse bar, G, in such manner that when the chair is opened out for use, as shown in Fig. 1, the ends of the said bar G will come in contact with the rear or under sides of the legs B, as represented in the said Fig. 1, and act as a brace to prevent the back E F of the chair from being tilted too far back. This transverse bar G may be made of cylindrical or other suitable shape, and also serves the purpose of a handle, by which the chair may be carried from place to place when in a folded or closed condition, as will be presently fully explained.

In opening or expanding the chair for use, the two pairs of legs A and B are turned upon their pivots C, so as to stand at an angle to each other, as shown in Fig. 1. The seat or bottom D being thus stretched out in a horizontal position, the back E F is then placed in an upright position, with the ends of the brace or bar G in contact with the rear or under sides of the legs B, as hereinbefore explained. The chair is then ready for use; and inasmuch as the rearmost edge of the seat or bottom D is attached to the back seat-rail below the axis thereof, as hereinbefore set forth, it follows that the weight of the occupant of the chair upon the said bottom will cause it to hold the stops formed by the ends of the transverse bar G firmly against the legs B, and thus securely retain the back E F in its proper upright position, while by grasping the back E F the chair may be lifted up and carried about, the lower portions thereof being sustained in place by the supporting action of the stops formed by the ends of the transverse bar G upon the legs B.

When it is desired to fold the chair, the two pairs of legs A and B are turned upon their pivots *c*, and are brought into a position parallel with each other. The legs A being situated within and being somewhat shorter than the legs B, the front seat-rail is enabled to pass or be brought under or below the back seat-rail in order to secure the greatest compactness when the chair is folded, the seat or bottom D being doubled or folded, as shown in Fig. 2. The back E F is then turned over forward upon its axis—or, in other words, upon the pivots *e* of the back seat-rail, C—until it is brought in front of and nearly parallel with the legs A and B, as represented in Figs. 2 and 3, thus bringing the several parts compactly together; and inasmuch as the bar G is brought uppermost by thus turning over or reversing the back E F, the said bar may be used as a handle, by which the chair as thus folded up may be carried from place to place.

What we claim as our invention, and desire to secure by Letters Patent, is—

1. The pair of legs A, connected by the seat-rail *b* at their upper ends and by the rail *a* near their lower ends, in combination with the pair of legs B, pivoted at *c* to the legs A and united only at their upper ends at the seat rail C, as specified, so that the rail *b* can pass entirely through beneath the rail C when the legs are folded, as set forth.

2. The seat-rail C, into which the side pieces or arms E of the back are framed and extended through to the bar G, in combination with the tie-bolt *e*, that connects the legs B and forms the axis on which the back E F swings, substantially as specified.

3. Connecting the frame forming the back to the folding legs by a riveted bar or pivots above the point at which the flexible seat is united to the back seat-rail, substantially as set forth, so that the flexible seat maintains the back in an upright position.

BENJN. J. HARRISON.
JAMES CONDIE.

Witnesses:
J. W. COOMBS,
A. LE CLERC.